(12) United States Patent
Scheinfeld et al.

(10) Patent No.: US 9,792,645 B2
(45) Date of Patent: Oct. 17, 2017

(54) VIDEO E-COMMERCE

(71) Applicant: Viewbix Inc., Ramat Beit Shemesh (IL)

(72) Inventors: Hillel Scheinfeld, Ramat Beit Shemesh (IL); Richard Kligman, Ramat Beit Shemesh (IL); Jonathan Stefansky, Ramat Beit Shemesh (IL)

(73) Assignee: Viewbix, Inc., Teaneck, NJ (US)

(*) Notice: Subject to any disclaimer, the term of this patent is extended or adjusted under 35 U.S.C. 154(b) by 189 days.

(21) Appl. No.: 14/257,413

(22) Filed: Apr. 21, 2014

(65) Prior Publication Data

US 2014/0372260 A1 Dec. 18, 2014

Related U.S. Application Data

(63) Continuation of application No. 13/613,164, filed on Sep. 13, 2012, now Pat. No. 8,706,562, which is a continuation of application No. 12/921,948, filed as application No. PCT/IL2009/000298 on Mar. 16, 2009, now Pat. No. 8,706,558.

(60) Provisional application No. 61/064,668, filed on Mar. 19, 2008.

(51) Int. Cl.
| | |
|---|---|
| *G06Q 30/06* | (2012.01) |
| *G06Q 20/12* | (2012.01) |
| *G06F 3/0481* | (2013.01) |
| *G06F 3/0484* | (2013.01) |
| *H04L 29/08* | (2006.01) |

(52) U.S. Cl.
CPC ....... *G06Q 30/0641* (2013.01); *G06F 3/0481* (2013.01); *G06F 3/04842* (2013.01); *G06Q 20/12* (2013.01); *G06Q 30/0603* (2013.01); *G06Q 30/0643* (2013.01); *H04L 67/10* (2013.01)

(58) Field of Classification Search
CPC .... G06Q 30/06; G06Q 30/0641; H04L 67/10; G06F 3/04842
USPC .............................................. 705/26.1, 27.1
See application file for complete search history.

(56) References Cited

U.S. PATENT DOCUMENTS 8,312,486 B1 * 11/2012 Briggs ................. H04N 21/435
725/32
2008/0040453 A1 * 2/2008 Cohen ...................... H04N 7/16
709/219

* cited by examiner

*Primary Examiner* — Mila Airapetian
(74) *Attorney, Agent, or Firm* — David H. Judson (57) ABSTRACT

A method, apparatus and computer program product to facilitate video interactions between a publisher, and a set of end users, the publisher having content available from a network-accessible site. Each end user has a device that includes a media player. In one embodiment, the method begins by receiving (e.g., via a web-based interface) information to configure a video module to execute in association with the end user media players. A particular instance of the video module is adapted to execute as an end user media player renders a video to provide interactivity to the video. Preferably, the interactivity specifies at least one of a set of interactivity actions available to an end user. The video module is then published. After deployment the video module, the platform receives data about (i) execution of the video module in the end user media players, and (ii) the interactivity actions.

11 Claims, 4 Drawing Sheets

VIDEO E-COMMERCE

BACKGROUND OF THE INVENTION

Technical Field

This disclosure relates generally to electronic commerce.

The Related Art

Electronic commerce (also known as e-commerce or ecommerce) refers to the buying and selling of products or services over electronic systems such as the Internet and other networks. Innovations that have contributed to electronic commerce include, inter alia, on-line marketing (i.e. the marketing of products or services over electronic systems), and electronic funds transfer.

BRIEF SUMMARY

A method, apparatus and computer program product to facilitate video interactions between a publisher, and a set of end users, the publisher having content available from a network-accessible site. Each end user has a device that includes a media player. In one embodiment, the method begins by receiving (e.g., via a web-based interface) information to configure a video module to execute in association with the end user media players. A particular instance of the video module is adapted to execute as an end user media player renders a video to provide interactivity to the video. Preferably, the interactivity specifies at least one of a set of interactivity actions available to an end user. The video module is then published. After deployment the video module, the platform receives data about (i) execution of the video module in the end user media players, and (ii) the interactivity actions.

The foregoing has outlined some of the more pertinent features of the subject matter. These features should be construed to be merely illustrative.

BRIEF DESCRIPTION OF THE DRAWINGS

To understand the subject matter and to see how it may be carried out in practice, embodiments will now be described, by way of non-limiting example only, with reference to the accompanying drawings, in which.

DETAILED DESCRIPTION OF EMBODIMENTS

Described herein are embodiments for video e-commerce. In one embodiment, a video e-commerce network enables the creation of a customized catalog with video(s) of product(s)/service(s), and/or enables a viewer of the catalog, to complete a transaction for purchasing a product/service from the catalog within a video e-commerce module.

As used herein, the phrase "for example," "such as" and variants thereof describe non-limiting embodiments.

As used herein, the term "commodity" refers to any product or service which can be bought, sold, exchanged and/or otherwise be the object of a transaction. The term "commodities" refers to at least two commodities, where the commodities may be products, services, or a combination of product(s) and service(s).

Reference in the specification to "one embodiment", "an embodiment", "some embodiments", "another embodiment", "other embodiments" or variants thereof means that a particular feature, structure or characteristic described in connection with the embodiment(s) is included in at least one embodiment. Thus, the appearance of the phrase "one embodiment", "an embodiment", "some embodiments", "another embodiment", "other embodiments" or variations thereof does not necessarily refer to the same embodiment(s).

It should be appreciated that certain features, which are, for clarity, described in the context of separate embodiments, may also be provided in combination in a single embodiment. Conversely, various features, which are, for brevity, described in the context of a single embodiment, may also be provided separately or in any suitable sub-combination.

Unless specifically stated otherwise, as apparent from the following discussions, it is appreciated that throughout the specification discussions, utilizing terms such as, uploading, inputting, outputting, configuring, storing, playing, enabling, disabling, generating, modifying, sequencing, associating, communicating, receiving, loading, retrieving, completing, selling, performing, initiating, transferring, sending, redirecting, providing, determining, indicating, processing, executing, publishing, reconfiguring, reducing, or the like, refer to the action and/or processes of any combination of software, hardware and/or firmware. For example, these terms may refer in some cases to the actions and/or processes of a computer that manipulates and/or transforms data into other data, said data represented as physical, e.g. such as electronic, quantities.

Embodiments may use terms such as module, network, element, constituent, processor, architecture, computer, apparatus, system, sub-system, logic, component, function, unit, device, or variants thereof (in single or plural form) for performing the operations described herein. These terms, as appropriate, refer to any combination of software, hardware and/or firmware capable of performing the operations as defined and explained herein.

The method(s)/process(es)/module(s) (or counterpart terms for example as specified above) presented herein are not inherently related to any particular system or other apparatus, unless specifically stated otherwise. In some embodiments, various general purpose systems may be used with programs in accordance with the teachings herein, or it may prove convenient to construct a more specialized apparatus to perform the desired method. The desired structure for a variety of these systems will appear from the description below. In addition, embodiments are not described with reference to any particular programming language. It will be appreciated that a variety of programming languages may be used in certain embodiments to implement the teachings as described herein.

Figure 1:
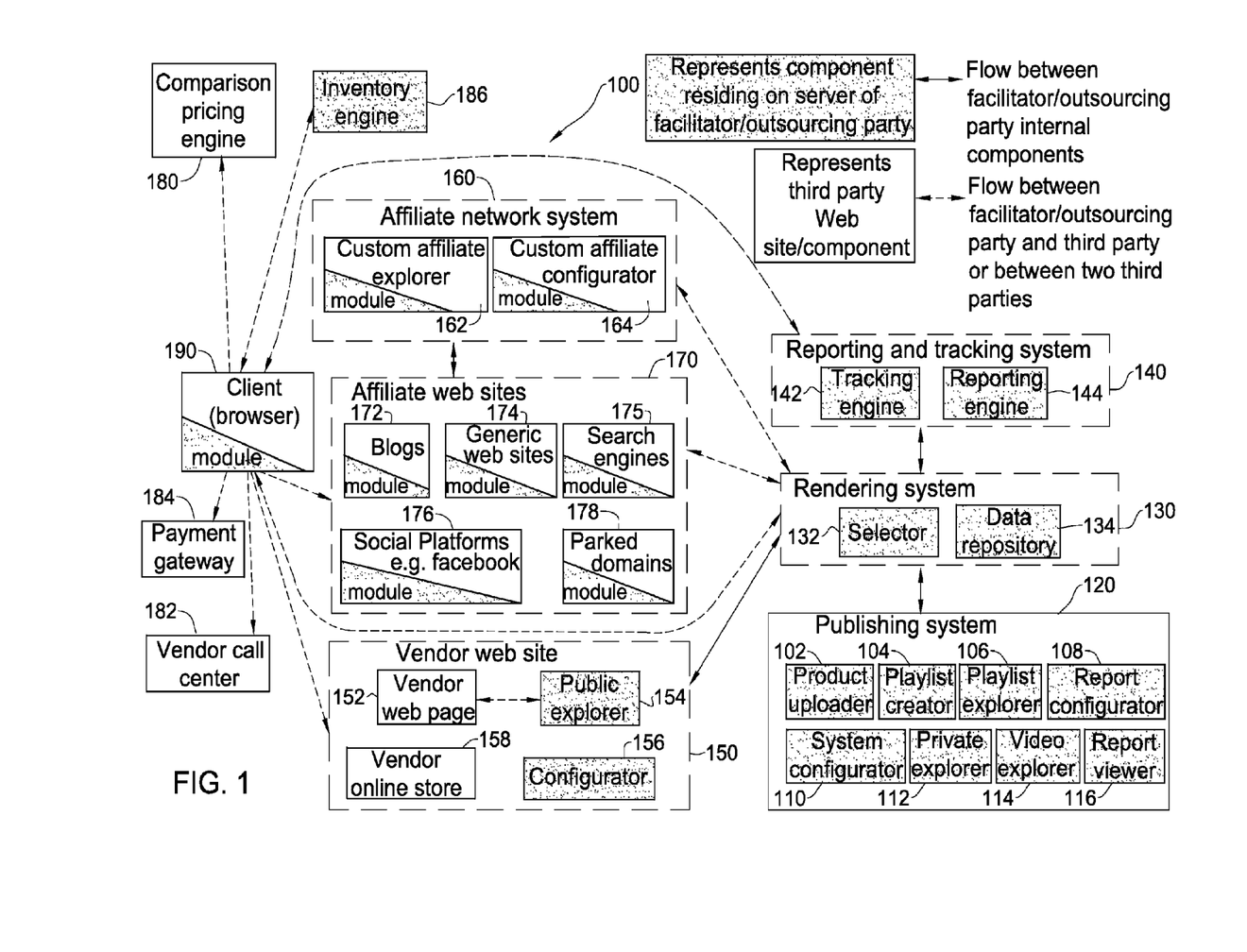
FIG. 1 is a block diagram of a video e-commerce network, according to an embodiment.

Referring now to the drawings, FIG. 1 illustrates a network 100 for video e-commerce, according to an embodiment. In the illustrated embodiment, network 100 includes the following inter-coupled elements: clients (user devices) 190 of viewers (i.e. potential buyers), affiliate network system 160, affiliate web sites 170, comparison pricing engine 180, inventory engine 186, vendor web sites 150, vendor call centers 182, payment gateway 184, reporting and tracking system 140, rendering system 130, and publishing system 120. For simplicity of illustration, user access to publishing system 120, vendor website 150 and/or affiliate network system 160 is not explicitly illustrated in FIG. 1 but will be described herein.

Depending on the embodiment, network 100 may comprise one or more communication networks of any appropriate type (e.g. Internet, Intranet, WAN, etc.), may use one or communication protocols of any appropriate type (e.g. IP, TCP, OSI, FTP, SMTP, WIFI, etc.), and the elements may be coupled in any appropriate manner (e.g. Optical fiber, Ethernet, Wireless LAN, HomePNA, Power line communication, cell phone, PDA, Blackberry GPRS, Satellite (e.g. GPS), other mobile delivery, etc.). Network 100 is not necessarily bound by the elements illustrated in FIG. 1 and, in some cases, network 100 may comprise fewer, more and/or different elements than those illustrated in FIG. 1 and/or a particular element may have more, less and/or different functionality than described herein. For example, elements illustrated as being separate systems in FIG. 1 may be part of the same system in other embodiments. As another example, in various embodiments certain elements may not be required for a particular implementation of video e-commerce. Continuing with the example, in one of these embodiments affiliate network system 160, vendor call center 182, payment gateway 184, comparison pricing engine 180, vendor website 150 and/or inventory engine 186 may not be included in network 100. Each element in network 100 may be made up of any combination of hardware, software and/or firmware capable of performing the operations as defined and explained herein.

Depending on the embodiment, there may or may not be common ownership/control of the various elements of network 100. The video e-commerce facilitator facilitates video e-commerce by operating, directly or indirectly, at least one of the elements used inter alia for creating, selecting, operating and/or monitoring a video e-commerce module. For example, the facilitator may directly operate at least one of these elements, or may indirectly operate at least one of these elements by outsourcing the operation of at least one of these elements through any type of agreement. In the illustrated embodiment, reporting and tracking system 140, rendering system 130, inventory engine 186, and publishing system 120 are operated by a video e-commerce facilitator, for example residing on server(s) of the facilitator and/or on the server(s) of outsourcing party/ies, but in other embodiments, any of these elements may be operated by other entities. Herein below, the term "facilitator" should be understood to include either or both the facilitator and any outsourcing parties, and the term "server(s) of the facilitator" and the like should be understood to include server(s) of the facilitator and/or of any outsourcing party/ies, as appropriate to the context. In the illustrated embodiment, it is assumed that the affiliate network system 160, the affiliates 170, vendors (web sites 150 and call centers 182), payment gateway 184, and comparison pricing engine 180 are operated by entities other than the video e-commerce facilitator but in other embodiments, the video e-commerce facilitator may for example operate the affiliate network, the comparison pricing engine, the payment gateway, etc. Alternatively or additionally, for example the facilitator may also be an affiliate, vendor, etc. and therefore operate any corresponding websites and/or call centers.

As illustrated in FIG. 1, within network 100, rendering system 130 includes a selector 132 and a data repository 134. Reporting and tracking system 140 includes a tracking engine 142 and a reporting engine 144. In one embodiment, rendering system 130 resides on server(s) of the video e-commerce facilitator. Vendor web site 150 includes a vendor webpage 152, public explorer 154, configurator 156, and vendor online store 158. In the illustrated embodiment, public explorer 154 and configurator 156 are hosted on server(s) of the facilitator while the other constituents of vendor web site 150 are not. However, in other embodiments, the constituents may be hosted differently, for example with public explorer 154 and/or configurator 156 hosted on server(s) of the vendor. Affiliate network system 160 includes a custom affiliate explorer 162, and a custom affiliate configurator 164. In one embodiment, custom affiliate explorer 162 and custom affiliate configurator 164 can access video e-commerce modules which are hosted on server(s) of the facilitator. The subject matter herein is not bound by the breakdown of these elements of network 100 into the illustrated constituents. In some cases an element may comprise fewer, more and/or different constituents than those illustrated. In some cases the functionality described with reference to a particular constituent may be performed additionally or alternatively by one or more other constituent. Each constituent may be made up of any combination of hardware, software and/or firmware capable of performing the operations as defined and explained herein.

Figure 2:
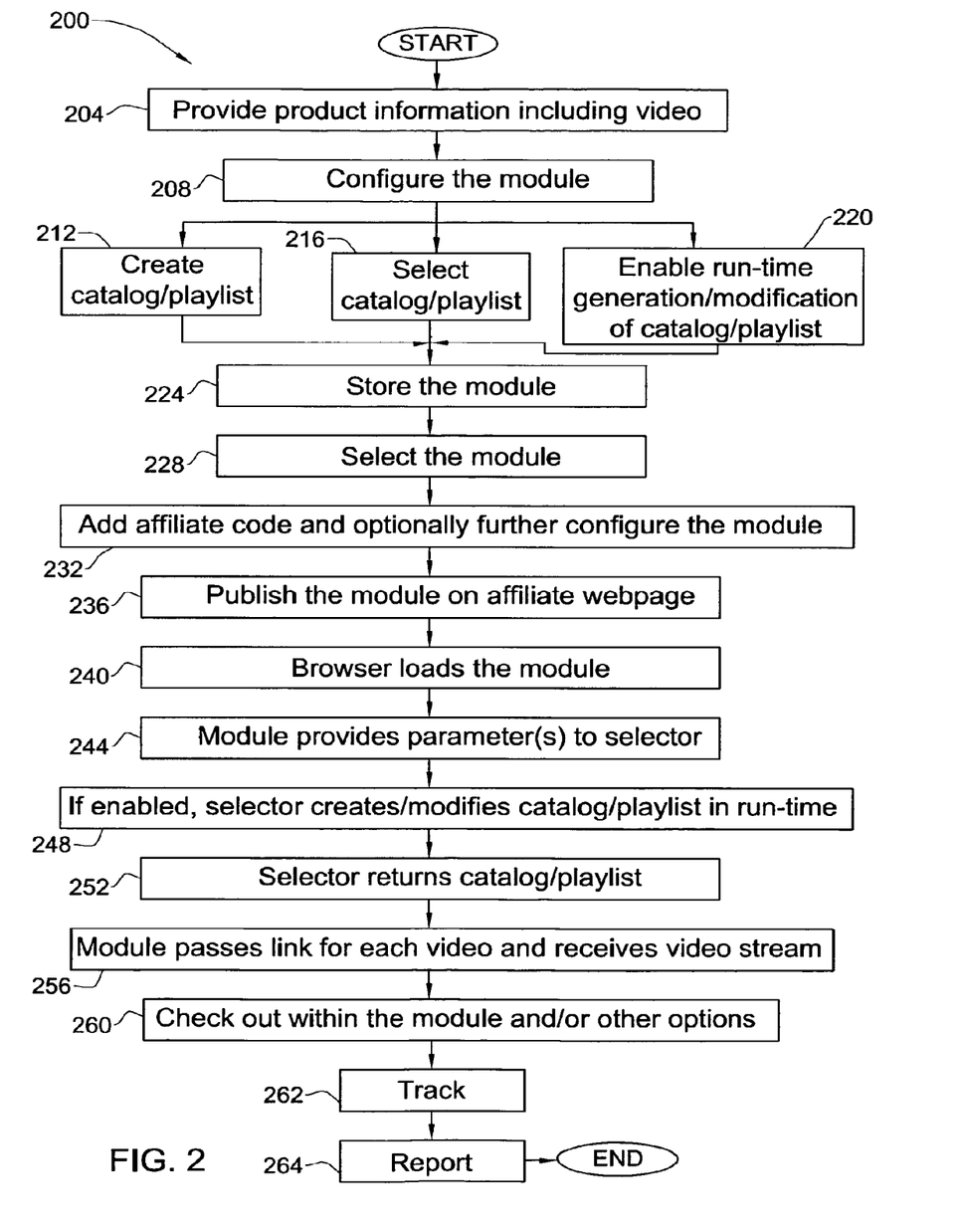
FIG. 2 is a flowchart of a method for video e-commerce, according to an embodiment.

FIG. 2 illustrates a method 200 for video e-commerce, according to an embodiment. Method 200 will be described in conjunction with network 100. In some cases, method 200 may include fewer, more and/or different stages than illustrated in FIG. 2, the stages may be executed in a different order than shown in FIG. 2, stages that are illustrated as being executed sequentially may be executed in parallel, and/or stages that are illustrated as being executed in parallel may be executed sequentially.

In the illustrated embodiment of FIG. 1, publishing system 120 provides capabilities for inter alia, creating, selecting and/or reviewing the performance of a video e-commerce module. The users of the publishing system are not limited by the invention, and can include, for example, vendors, affiliates, registered users, and/or any users allowed by a particular embodiment. As illustrated, publishing system 120 includes product uploader 102, playlist creator 104, playlist explorer 106, report configurator 108, system configurator 110, private explorer 112, video explorer 114, and report viewer 116. In one embodiment, publishing system 120 resides on server(s) of the facilitator. In one embodiment, users may access publishing system 120 via a webpage on a website of the facilitator. Publishing system 120 is not necessarily limited to the constituents illustrated in FIG. 1. In some cases publishing system 120 may comprise fewer, more and/or different constituents than the illustrated constituents 102, 104, 106, 108, 110, 112, 114, and 116. In some cases the functionality described with reference to constituent 102, 104, 106, 108, 110, 112, 114, or 116 may be performed additionally or alternatively by one or more other constituent. Each constituent 102, 104, 106, 108, 110, 112, 114, or 116 may be made up of any combination of hardware, software and/or firmware capable of performing the operations as defined and explained herein.

In one embodiment, the video e-commerce module is a web widget, however, the subject matter herein is not limited. In one embodiment, the video e-commerce module is based on the Adobe Flash Player platform and associated ActionScript scripting language, however, the subject matter is not limited. For example, in other embodiments, the video e-commerce module may be based on Mobile, Silverlight, VB, C#, Java Applet, etc.

In stage 204, information on a product or service is inputted for example via product uploader 102. Depending on the embodiment, information on a product/service may be inputted via product uploader 102 in any appropriate manner. For example, in one embodiment, product/service information may be entered manually. As another example, product/service information may be copied from a vendor system, for example using a drag and drop procedure. Continuing with the example, in some cases the procedure may be based on XML and/or other API web services. As another example, product/service uploader 102 may interface with a vendor system and retrieve product/service information.

In some embodiments, a video is associated with one or more products and/or services. In some of these embodiments, as part of stage 204, a web link (e.g. URL) to the associated video for example on a video sharing website (i.e. content distribution network) such as YouTube, Google video, etc., is entered via product uploader 102 into publishing system 120. For example, in one of these embodiments, the product uploader may then use the web link to connect to the video sharing website and retrieve metadata associated with the video. Continuing with the example, in some cases the metadata may include inter-alia any of the following: title, tags and description relating to the video. In other embodiments, the video itself may be uploaded via product uploader 102 in stage 204. As an aside, it is noted that the video sharing website may in some cases host videos on a backbone of a larger content distribution network, such as Akamai, and therefore the actual location of the video may be on a server of the larger content distribution network.

Assuming embodiments where a particular video is associated with a plurality of products/services, in one of these embodiments product uploader may also upload a mapping between the different segments of that video and the various associated products/services. For example, the beginning and ending elapsed times of each video segment, relating to a different product/service, may be mapped to the associated product/service.

The product/service information entered in stage 204 is not limited and may comprise any type of information relating to the associated video including any of the following inter alia: video, video link, video thumbnail, link to thumbnail, and/or video metadata. For each product/service associated with the video, the product/service information entered in stage 204 may comprise any type of information including any of the following: category identifier, product/service name, description, pricing, link to inventory engine 186, picture or picture link, vendor information including vendor identifier, reviews (professional and/or viewer), comments/tags, link for chatting with vendor online store 158, link for buying from vendor online store 158, email address for sending an email to vendor online store 158, link for talking with vendor call center 182, link to comparison pricing engine 180, link to payment gateway 184, etc.

In some embodiments, some or all of the product/service information entered in stage 204 is stored in the data repository 134 of the rendering system 130. For example, any of the following inter alia may be stored: metadata on video, product/service name, description, pricing, link to inventory engine 186, category identifier, picture or picture link, vendor information including vendor identifier, comments/tags, reviews (professional or viewer), link for chatting with vendor online store 158, link for buying from vendor online store 158, email address for sending an email to vendor online store 158, link for talking with vendor call center 182, link to comparison pricing engine 180, link to payment gateway 184, etc., may be stored in data repository 134. As another example, depending on the embodiment, a link to the associated video and/or link to video thumbnail on a video sharing website may be stored in data repository 130, and/or or the associated video and/or thumbnail may be stored in data repository 130. For simplicity of description it is assumed below that a link to the video is stored in data repository 130 and not the video itself.

As mentioned above, the order of stages shown in FIG. 2 is not necessarily the same for all embodiments. For example, stage 208 in some cases is performed next, either partly or fully, whereas in other cases stage 208 is performed right before stage 224. Continuing with the example, in one embodiment, if stage 212 or stage 216 is executed, then stage 208 is performed fully or partially after stage 212/216 whereas, if stage 220 is executed then stage 208 is performed prior to stage 220. Nevertheless, stage 208 is described now.

In stage 208, a video e-commerce module is configured using for example, system configurator 110. In some embodiments, there are features that are always present in the e-commerce module and other features which may be configured in stage 208. For example, in some of these embodiments, there is a generic e-commerce module that includes capabilities common to all modules. Continuing with the example, common features may include in some cases any of the following inter alia: video playing capabilities, some or all aspects of the user interface, and/or logic within the module (for example allowing any of the following inter alia processing indications from a viewer, grabbing code, posting the module, navigating the menu, exploring the playlist, printing, calling and/or linking to outside resources, providing information to a viewer, and/or tracking). Continuing with the example, in one of these embodiments, part of the common logic within the module allows the completion of a purchase transaction within the module. In embodiments with a generic e-commerce module, in stage 208, a new video e-commerce module is configured by taking the generic video e-commerce module and selecting features which are not necessarily common to all modules. Alternatively, in this embodiment, the video e-commerce module may be configured starting with an already configured e-commerce module and further adapting some of the configurable features. For example, in some cases, configurable features may include any of the following inter alia: autoplay of product/service videos/versus muted autoplay of product/service videos, versus non-automatic play of product/service videos, automatic rotation of videos versus manual rotation or no rotation, menus on versus menus off, price comparison on versus off, and/or appearance of the module (e.g. color, size, etc). In one embodiment, some features may be left un-configured to be configured at a later stage (see below stage 232) or may be configured and later optionally re-configured (for example at stage 232).

A catalog of one or more products/services is associated with the configured video e-commerce module. It is assumed that all of the products/services in the catalog of products/services associated with the video e-commerce module are inputted via product uploader 102 prior to the catalog being created. Depending on the embodiment, the catalog can be created by playlist creator 104 as part of the procedure of configuring the video e-commerce module, the catalog could have been created earlier and may be available for selection by playlist explorer 106, or the catalog may be created in time to be accessible to a viewer.

Assuming the creation of catalog as part of the procedure of configuring the video e-commerce module, in stage 212, the catalog, including a video playlist, is created by playlist creator 104. In the illustrated embodiment, a feature of the catalog is that the catalog includes inter alia video(s) or links to video(s), because video tends to provide a rich multimedia experience of the product(s)/service(s), and therefore, in this embodiment, a playlist of one or more videos is an integral part of the catalog. In this embodiment, selection or identification of a catalog inherently selects or identifies the included playlist, and vice versa. The catalog and included playlist can be created manually or automatically, depending on the embodiment. In the manual creation mode, videos of product(s)/service(s) that have previously been inputted are available for exploring via video explorer 114. For example, in one embodiment via video explorer 114, a user may be presented with the metadata of an available video, with the name of the product(s)/service(s) associated with the video, with any other product(s)/service(s) information, and/or with the opportunity to view the video (for example by clicking on a textual or icon link to a video sharing website). The user may thus select the products/services to be comprised in the catalog (or equivalently the associated videos on the playlist).

In some embodiments of the automatic mode of creation of catalog and included playlist, playlist creator 104 selects the product(s)/service(s)/associated video(s) and/or sequences the playing of the videos in the playlist based on criteria specified by a user, for example vendor name(s); product/service category(ies); the maximum, minimum or exact number of product(s)/service(s) and/or video(s) to be selected; the maximum, minimum or exact number of vendor(s) to be selected; the maximum, minimum or exact number of product/service category(ies) to be selected; desired level of performance (for example based on past tracking data), etc. In these embodiments, depending on the embodiment the user may also specify the algorithm rule(s), choose from among available algorithm rules, or the algorithm rules may be predefined by the facilitator. In other embodiments of the automatic mode, playlist creator 104 selects the product(s)/service(s)/associated video(s) and/or sequences the playing of the videos randomly or based on an algorithm specified by the video e-commerce facilitator. In some cases when the algorithm is less defined by the user and more defined by the facilitator, there may be a greater reliance on past experience (i.e. from tracking data) in selection of the product(s)/service(s)/associated video(s) and the sequencing the videos, but less customization to the user's preferences. In some cases, where there is random selection/sequencing of product(s)/service(s)/associated video(s) to be included in the catalog (i.e. when a more experimental approach is taken), in some cases tracking engine 142 may collect statistics on product(s)/service(s)/associated video(s) which on first glance would not be assumed to perform well but may be found based on the statistics to perform well or vice versa. Therefore, it should be evident that there are advantages to various approaches of automatic creation of the catalog with tradeoffs between user customization, reliance on past experience, and experimentation.

In another embodiment, a pre-existing catalog/playlist (i.e. which is stored in data repository 130) is selected via playlist explorer 106 in stage 216. For example, the user may input a playlist/catalog identifier via playlist explorer 106. As another example, the user may specify criteria such for example, as vendor name(s), highest performer(s) (based on tracking data), and/or category/(ies) of product(s)/service(s) and playlist explorer 106 may then present the user with the catalog/playlist which includes product(s)/service(s) that match the criteria.

In another embodiment, the video e-commerce module is configured in stage 220, for example via configurator 110, to enable run-time generation of the catalog and the included playlist.

In another embodiment, a catalog/playlist is selected in stage 216 or created in stage 212, and in stage 220 the video e-commerce module is configured to enable run-time modification of the created or selected catalog/playlist.

For example, there may be parameter called herein below "vsense" that in stage 220 is disabled if run-time generation/modification is not desired and enabled if run-time generation/modification is desired.

Depending on the embodiment, there may be a higher or lower level of customization in stage 220 of a generation/modification algorithm which will be executed in run-time for selecting product(s)/service(s)/associated video(s) for the catalog/playlist and/or for video sequencing. For example, in one embodiment there may be no customization based on the configured video e-commerce module, and the algorithm will be randomly determined or the algorithm may have been predefined for selector 132 by the facilitator. For example, in some cases random selection/sequencing of product(s)/service(s)/associated video(s) to be included in the catalog (i.e. experimentation) may allow tracking engine 142 to collect statistics on product(s)/service(s)/associated video(s) which on first glance would not be assumed to perform well but may be found based on the statistics to perform well or vice versa. In embodiments where there is no customization based on the configured module, the same algorithm may be executed for each module, or different algorithms may be executed for different modules but with the differences in the algorithms independent of the various configurations of the different modules. As another example, in one embodiment, the algorithm rules may not be configured in stage 220 (e.g. the rules may have been predefined for selector 132 by the facilitator) but at least some of the (e.g. selection and/or sequencing) criteria required for execution of the algorithm may be configured (i.e. customized) in stage 220. Examples of algorithm criteria which may be configured in this embodiment include any of the following inter alia: the vendor name(s); product/service category(ies); the maximum, minimum or exact number of product(s)/service(s) and/or video(s) to be selected; the maximum, minimum or exact number of vendor(s) to be selected; the maximum, minimum or exact number of product/service category(ies) to be selected, etc. Examples of algorithm criteria that are less likely to be configured in stage 220 of this embodiment include any of the following inter alia: website keywords, viewer data, and/or uncontrollable variables (e.g. time of day, weather, day of week, etc. of algorithm execution). If the algorithm relies at least partly on tracking data (e.g. the number of "buy it now" click counts, or the number of view counts for a product/service/video), then the type(s) of tracking data to be relied upon in the algorithm may or may not be configured in stage 220 of this embodiment. As another example, in one embodiment, a user may select from among different available algorithms and configure the algorithm identifier (i.e. associate the algorithm identifier with the module) in stage 220. In this embodiment, the user may or may not also configure the algorithm criteria. As another example, in one embodiment, the user may configure the rules of the algorithm in stage 220. In this embodiment, the user may or may not also configure the algorithm criteria. In some cases, when the algorithm is less customized and more defined by the facilitator, there may be a greater reliance on past experience (i.e. from tracking data) in the selection of the product(s)/ service(s)/associated video(s) and the sequencing the videos. There are therefore advantages to various approaches to the generation/modification algorithm with tradeoffs between user customization, reliance on past experience, and experimentation.

In one embodiment, where stage 208 occurs at least partly during or after the creation or selection of the catalog/playlist in stage 212 or 216, after the playlist has been created or selected a user configures which video will be the first to be played from the playlist, for example by specifying the video identifier of the first-to-play video.

In stage 224, the video e-commerce module is stored in data repository 134. For example, in some embodiments, data repository 134 may be structured by entries with one entry defining the current video e-commerce module including an identifier of the current video e-commerce module, features of the generic video e-commerce module, features configured for the current video e-commerce module, the playlist identifier (which inherently also identifies the catalog) if a playlist was selected or created, and if run-time generation/modification of the playlist was enabled then in some cases the algorithm rules and/or criteria for run-time generation/modification. In turn, each playlist/catalog identifier corresponds to an entry which includes a list of identifiers for all the videos on the playlist, for example in the order that the videos are to be played. The entry may include video sequencing information, for example always, or only if the list of video identifiers is not in the order that the video are to played. Continuing with this example, in one of these embodiments, each video identifier corresponds to an entry which includes any of the following inter alia: a link to the video for example on the video sharing website, a link to the video thumbnail on the video sharing website and/or the thumbnail itself, metadata on the video, and one or more identifiers of products/services associated with the video. In this embodiment, each product/service identifier corresponds to an entry which includes any of the following inter-alia: product/service information such as name, description, category identifier, pricing, link to inventory engine 186, picture(s) or picture link(s), vendor information including vendor identifier, reviews (professional and/or viewer), comments/tags, link for chatting with vendor online store 158, link for buying from vendor online store 158, email address for sending an email to vendor online store 158, link for talking with vendor call center 182, link to comparison pricing engine 180, link to payment gateway 184, etc. In another of these embodiments for this example, where a video corresponds to only one product/service, all the data on the video and the product/service may be included in the same entry, for example including any of the following inter alia: an identifier of the video/product/service, link to video, link to video thumbnail and/or thumbnail itself, metadata on video, product/service name, description, pricing, link to inventory engine 186, picture(s) or picture link(s), vendor information including vendor identifier, reviews (professional and/or viewer), comments/tags, link for chatting with vendor online store 158, link for buying from vendor online store 158, email address for sending an email to vendor online store 158, link for talking with vendor call center 182, link to comparison pricing engine 180, link to payment gateway 184, etc. It is noted that the various product/service/video entries may have already been created in stage 204. If the catalog/playlist was created in stage 212 then the catalog/playlist entry would also need to be stored in data repository 134, for example in stage 224. However, if a pre-existing catalog/playlist was selected in stage 216. then the catalog/playlist entry would have been stored earlier, at the time of the original creation of the catalog/playlist.

It should be understood that a catalog can include one or more product(s) and/or service(s) and the playlist can include one or more video(s). In some cases where the playlist includes one video, the playlist identifier may be replaced by the video identifier and therefore the video e-commerce module entry in data repository 134 may include the associated video identifier rather than the playlist identifier. In other cases, the video e-commerce module entry includes the playlist identifier regardless of the number of videos in the playlist.

In some cases, the video e-commerce module entry in data repository 134 may include both the playlist identifier and a video identifier which identifies the first video on the playlist to play.

Once the video e-commerce module has been stored in data repository 134, the module is available for selection in stage 228. For example, a user may browse available video e-commerce modules via a private explorer webpage 112 of publishing system 120 and select an available video e-commerce module. As another example, a user may browse video e-commerce modules by accessing a vendor web page 152 of a vendor web site 150 which references a public explorer page 154. As mentioned above, in some cases in this example public explorer page 154 may be hosted on a server of the video e-commerce facilitator. Continuing with the example, in some cases only video e-commerce modules with a relationship to the vendor may be available via the vendor web page (e.g. associated catalog includes product/service of that vendor, or e.g. identifier of vendor or category of vendor's products/services specified for run-time generation/modification of catalog/playlist, etc.). As another example, a user may browse available video e-commerce modules among all offerings of affiliate network 160 using affiliate explorer 162. Examples of currently available affiliate networks include inter-alia CJ.com and linkshare.com. Depending on the embodiment, it may or may not be evident to the user that an explorer page is hosted on a server of the video e-commerce facilitator, and for example in one embodiment public explorer page 154 when hosted by the facilitator server may still appear to be part of vendor web site 150.

The user in one embodiment who is selecting the module may be an affiliate who wishes to publish the module on a website thereof and thereby participate in the video e-commerce. (Hence affiliates are also known as "publishers"). There is no limitation however on the nature of the user, and non-affiliate users in some embodiments may also be able to access video e-commerce modules and/or select such modules. For simplicity of description, it is assumed below that the user who selects the module is an affiliate or that the selection is performed on behalf of an affiliate.

In stage 232, the corresponding configurator (for example configurator 110, configurator 156, or configurator 164) is used to further configure/re-configure the selected video e-commerce module. For example, an identifier of the user who selected the module (for example an affiliate code) may be associated with the module. In some cases of this example, if the user is a registered user then the identifier may be known to the corresponding configurator, but if the user is not a registered user then the user may have to manually input the identifier. In some embodiments of this example, the affiliate code allows the affiliate to receive compensation for certain action(s) of a viewer of the module on a website of the affiliate and thereby participate in the video e-commerce. In one of these embodiments, the affiliate code is embedded in the link for buying from vendor online store 158 (i.e. "buy it now link") and possibly in other links to the vendor so that the vendor can properly compensate the affiliate. As another example, certain features of the module may be configured or reconfigured in stage 232 including any of the following inter alia: autoplay of product/service videos versus muted autoplay of product/service videos, versus non-automatic play of product/service videos, automatic rotation of videos versus manual rotation versus no rotation, menus on versus menus off, price comparison on versus off, and/or appearance of the module (e.g. color, size, etc.).

In stage 236, the video e-commerce module is published on (i.e. associated with) the website 170 of the affiliate. The type of website is not limited by the invention. In some embodiments, the module is published on an affiliate webpage which includes data unrelated to the module. Examples of such webpages include inter-alia: a blog 172, a generic website 174, a search engine 175, a social platform (e.g. Facebook) 176, etc. In others embodiments, publishing includes devoting an entire webpage to the module. For example, in one of these embodiments, instead of having an underutilized or expired domain ("parked domain") contain advertisement listings and links, or redirect to another website, a video e-commerce module can be published on the parked domain 178. Parked domain 178 will then function as a shopping network. For the sake of illustration, in FIG. 1, video e-commerce modules are shown "published" on various webpages 172, 174, 175 176, 178.

In one embodiment, it may be possible for a (first) affiliate to view a module on a webpage of a second affiliate (for example see "grab code" or "post code" feature of the module described below with reference to FIG. 4) and decide to also publish that module. The (first) affiliate may then select the viewed module (stage 228) and change the current affiliate code (stage 232) from the affiliate code of the second affiliate to the affiliate code of the (first) affiliate prior to publishing the module on the website of the (first) affiliate in stage 236.

The video e-commerce module may be published in any appropriate manner and by any appropriate means. For example, in one embodiment, publishing may include a simple copy command (see for example "grab code" feature of module described below) and a paste command to publish the module on a target webpage. As another example, in one embodiment, the module may include a "post module" interface (see below description of module features) within the module which allows the publishing of the module on a target webpage. As another example, alternatively or additionally, an application programming interface API of the target website may service the request to publish the module. Continuing with the example, the affiliate may be required to provide identification such as user name and password prior to being allowed to publish the module on a webpage.

In the illustrated embodiment, once the video e-commerce module has been published on (i.e. associated with) a webpage, the associated webpage includes information that allows a browser when loading the associated webpage to load the module which resides on facilitator server(s) (see stage 240). For example, the included information can include any of the following inter-alia module identifier, link to facilitator server(s) where data repository 130 including the module resides, etc. In this embodiment, stage 232 activity may also be reflected on the associated webpage during the publishing stage of 236 and/or may be reflected in the data on the module which is stored in data repository 130, depending on the particular implementation. It is possible, however, that in other embodiments the video e-commerce module once published, resides on a server of the affiliate website and is therefore loaded by the browser from the affiliate server.

In stage 240, the web-browser of a viewer accesses the webpage on which the module has been published and therefore loads the video e-commerce module onto the client 190 (i.e. onto the user device of the viewer). For the sake of illustration, the video e-commerce module is shown in FIG. 1 "loaded" onto user device 190 of the viewer. In some embodiments, the video e-commerce module is adapted to conform to the type of client 190, for example computer versus mobile telephone. In one of these embodiments, the adaptation is based on browser type as provided by the browser.

In stage 244, the video e-commerce module, once loaded, provides to a selector 132 one or more parameters which allows selector 132 to retrieve the catalog/playlist associated with the module and return the catalog/playlist in stage 252 to the video e-commerce module. In one embodiment, selector 132 is assisted by an API, for example a web service. In some cases, if creation/modification is enabled, selector 132 creates or modifies the catalog/playlist to be retrieved based on the parameter(s) (stage 248). In other cases an identifier of the catalog/playlist to be retrieved is provided as a parameter to selector 132.

Figure 3:
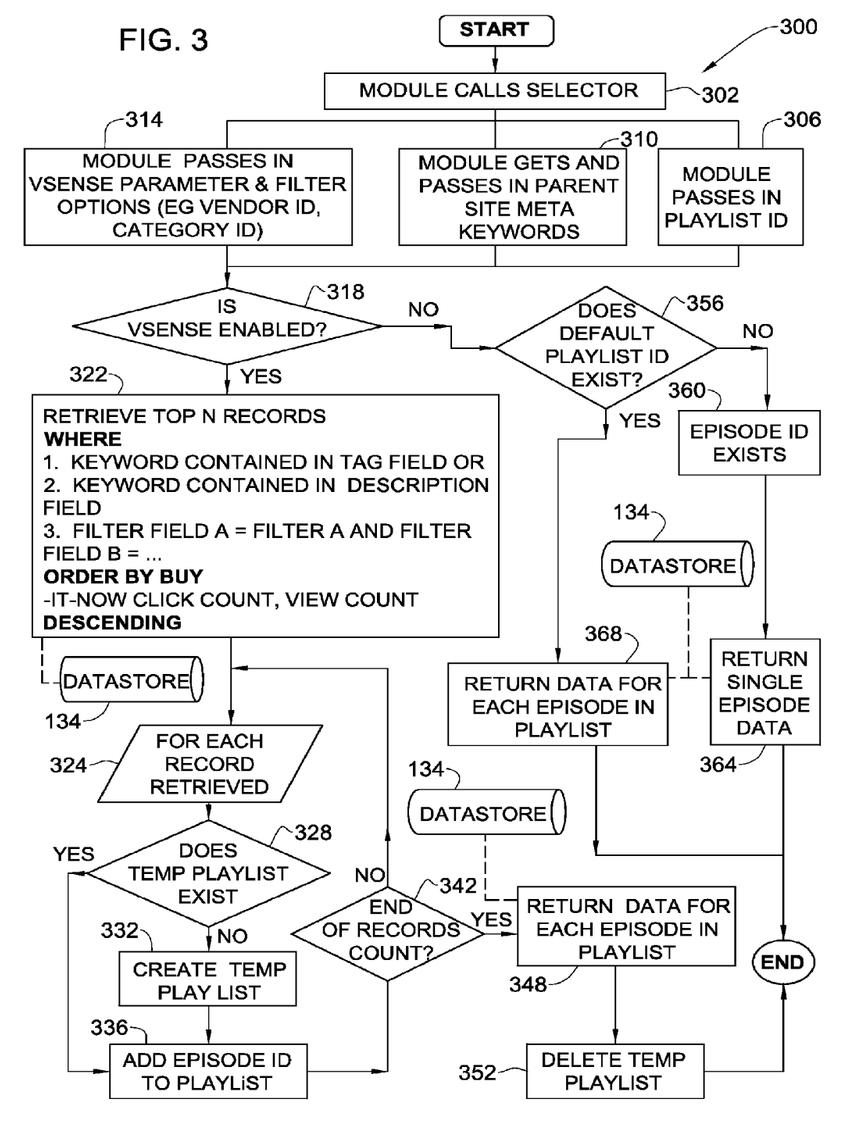
FIG. 3 is a flowchart of a method for creating or modifying a catalog, according to an embodiment.

Refer to FIG. 3, which illustrates a method 300 executed by selector 132 corresponding to stages 244, 248 and 252, according to an embodiment. In some cases, method 300 may include fewer, more and/or different stages than illustrated in FIG. 3, the stages may be executed in a different order than shown in FIG. 3, stages that are illustrated as being executed sequentially may be executed in parallel, and/or stages that are illustrated as being executed in parallel may be executed sequentially.

In stage 302, the video e-commerce module that has been loaded onto client 190 calls selector 132. In the illustrated embodiment, it is assumed that parameter(s) identifying the catalog/playlist or which can influence the selection of the catalog/playlist is provided to selector 132. For example, if a playlist identifier or video identifier has been associated with the module, then the identifier is provided to selector 132 in stage 306. As another example, additionally or alternatively, keywords of website 170 (where the module was published) may be provided to selector 132 in stage 310. Continuing with the example, in one embodiment, the video e-commerce module has the functionality to interrogate the document object module of the browser in order to receive the keywords. These keywords may in some cases allow selector 132 to create/modify a catalog (including a playlist) which is an appropriate fit with the content of website 170. As another example, additionally or alternatively, if selection and/or sequencing criteria has been specified during configuration of the module (for example, in stage 220), then the criteria are provided to selector 132 in stage 314. As another example, additionally or alternatively, if algorithm rules have been specified during configuration of the module (for example, in stage 220), then the rules are provided to selector 132. As another example, additionally or alternatively, the value of the "vsense" parameter may be provided in stage 314, specifying whether or not run-time generation/modification of the catalog/playlist is enabled or disabled.

In some embodiments, the video e-commerce module may also provide data on the viewer to selector 132. In one of these embodiments, viewer data may be derived without the viewer actively disclosing information. For example geo-data on the viewer (e.g. the geographic location of the viewer) may be derived from the IP address and/or other data of client 190. In another embodiment, additionally or alternatively, viewer data may be provided explicitly by the viewer. Continuing with this embodiment, in some cases the viewer may register with the video e-commerce facilitator, specifying information which can be used to customize the catalog (and included playlist) to the preferences of the viewer. Continuing with this embodiment, in some cases, the viewer may register via system configurator 110, configurator 156 or custom affiliate configurator 164. For example, the viewer may specify the categories of products/videos and/or the vendors from which the viewer is interested in buying. The viewer specified data may be stored on client 190 (for example in a cookie) and provided by the video e-commerce module to selector 132 after the module has been loaded onto the client. Alternatively, the viewer specified data may be stored in data repository 134 (i.e. in this embodiment data repository 134 may also include viewer entries) and retrieved by selector 132 after having identified the viewer. For example, during the registration process, an identifier of the viewer may be established which can be transmitted by the video e-commerce module after the module has been loaded onto client 190.

In the illustrated embodiment in stage 318, selector 132 determines whether the received "vsense" parameter is enabled and therefore run time generation or modification of the catalog/playlist is desired.

If the "vsense" parameter is enabled then in stage 322, selector 132 selects the products/services for the catalog (or equivalently the associated video(s) on the playlist) and sequences the video playing. As mentioned above with reference to stage 220, there may be different levels of customization of the algorithm for selection of the products/services for the catalog and the associated video(s) for the playlist, and for the sequencing of the video playing.

There are many possible algorithms which can be executed by selector 132. The algorithm shown in stage 322 is only one example of a possible algorithm and should therefore not be considered to bind the invention. In the algorithm illustrated in stage 322, selector 132 retrieves the top N videos from data repository 134, where one of the keywords appears in the tag field of at least one (or all) of the products/services associated with the video or in the description field of at least one (or all) of the products/services associated with the video and where the vendor identifier and category identifier of at least one of the products/services associated with the video (or where the vendor identifier and category identifier of all of the associated products/services) match one of the vendor identifiers and category identifiers provided to the selector in stage 314. Selector 132 then sequences the top N videos using tracking data including "buy it now/checkout click count" and/or "view count" so that the video with the highest count for sales and/or views is sequenced to be played first. In one embodiment, where a video is associated with multiple products/services the tracking data is totaled for all the associated products/services, whereas in another embodiment the tracking data is for one of the associated product/services, for example the first product/service mentioned in the video.

In the illustrated embodiment, for the first retrieved record (i.e. for the retrieved entry of the first sequenced video) in stage 324, because no temporary playlist exists (no to stage 328), a temporary playlist is created in stage 332. In stage 336, the video identifier is added to the created temporary playlist. For each subsequent retrieved record, the corresponding video identifier is also added to the created temporary playlist in a subsequent round of stage 336. When all N records have been retrieved (yes to stage 342), the data in data repository 134, which correspond to the N records is retrieved, and the total data (i.e. the created catalog which includes the created playlist) is returned to the video e-commerce module in stage 348. In stage 352, the temporary playlist may be deleted if desired. The method 300 then ends.

If alternatively, "vsense" is disabled (no to stage 318), selector 132 determines in stage 356 if the playlist identifier had been provided. If a playlist identifier has not been provided, a video identifier will have been provided (stage 360). Therefore in stage 364, selector 132 returns to the video e-commerce module the data relating to the single video from data repository 134 and method 300 ends. In this case the playlist will comprise one video and therefore the catalog will relate to the product(s)/service(s) associated with the single video.

If the playlist (or equivalently catalog) identifier has been provided (yes to stage 356), then in stage 368 selector 132 returns to the video e-commerce module the data from data repository 134 relating to each video on the identified playlist (i.e. returns a catalog) and method 300 ends.

For each video, the data returned in stage 348, 364, or 368 may include any of the following inter alia: a link to the video for example on the video sharing website, a link to the video thumbnail and/or thumbnail itself, and metadata on the video. The sequencing of the videos may also be indicated. For each of the products/services associated with a particular video the data returned in stage 348, 364, or 368 may include any of the following inter alia: product/service information such as name, description, pricing, link to inventory engine 186, picture(s) or picture link(s), vendor information, product/service (or video) identifier, category identifier, comments/tags, reviews (professional and/or viewer), link for chatting with vendor online store 158, link for buying from vendor online store 158, email address for sending an email to vendor online store 158, link for talking with vendor call center 182, link to comparison pricing engine 180, link to payment gateway 184, etc.

In some cases, the catalog (and included playlist) returned in stage 348, 364, or 368 may also include any links to related live video feeds which are currently being captured or are scheduled to be captured within the near future (for example within ten minutes or within the period that a viewer is expected to interact with the module), with these live video feeds also sequenced within the returned playlist. The live feed(s) link may for example link to the source of the video streaming directly or via vendor web site(s) 150. The related live video feed(s), for example may be consistent with products/services retrieved from data repository 134 as part of the catalog, the categories of the retrieved products/services in the catalog, the vendors of the retrieved products/services in the catalog, the website keywords, the viewer specified information, etc.

In another embodiment, where the video e-commerce module is stored on the affiliate server upon publishing, the data constituting the catalog and included playlist may be stored on a server of affiliate website 170 soon after the video e-commerce module is published on website 170. For example, similarly to method 300 but occurring once the video e-commerce module is published on website 170, the catalog/playlist may be created on the fly by selector 132 or the playlist identifier/video identifier may be passed to selector 132. The data retrieved from data repository 134 (i.e. the catalog and included playlist) is provided to and stored on an affiliate server, for example the same affiliate server which houses the video e-commerce module. The data retrieved and stored may include any of the following inter alia for each video: a link to the video for example on the video sharing website, a link to the video thumbnail and/or thumbnail itself and metadata on the video. The sequencing of the videos may also be indicated. For each of the products/services associated with a particular video the data retrieved and stored may include any of the following inter alia: product/service information such as name, description, pricing, link to inventory engine 186, picture(s) or picture link(s), vendor information, product/service (or video) identifier, category identifier, comments/tags, reviews (professional and/or viewer), link for chatting with vendor online store 158, link for buying from vendor online store 158, email address for sending an email to vendor online store 158, link for talking with vendor call center 182, link to comparison pricing engine 180, link to payment gateway 184, etc. In this embodiment, the retrieved data which is stored on the affiliate server may be downloaded to client 190 (i.e. received at client 190) when the video e-commerce module is loaded to the browser.

Figure 4:
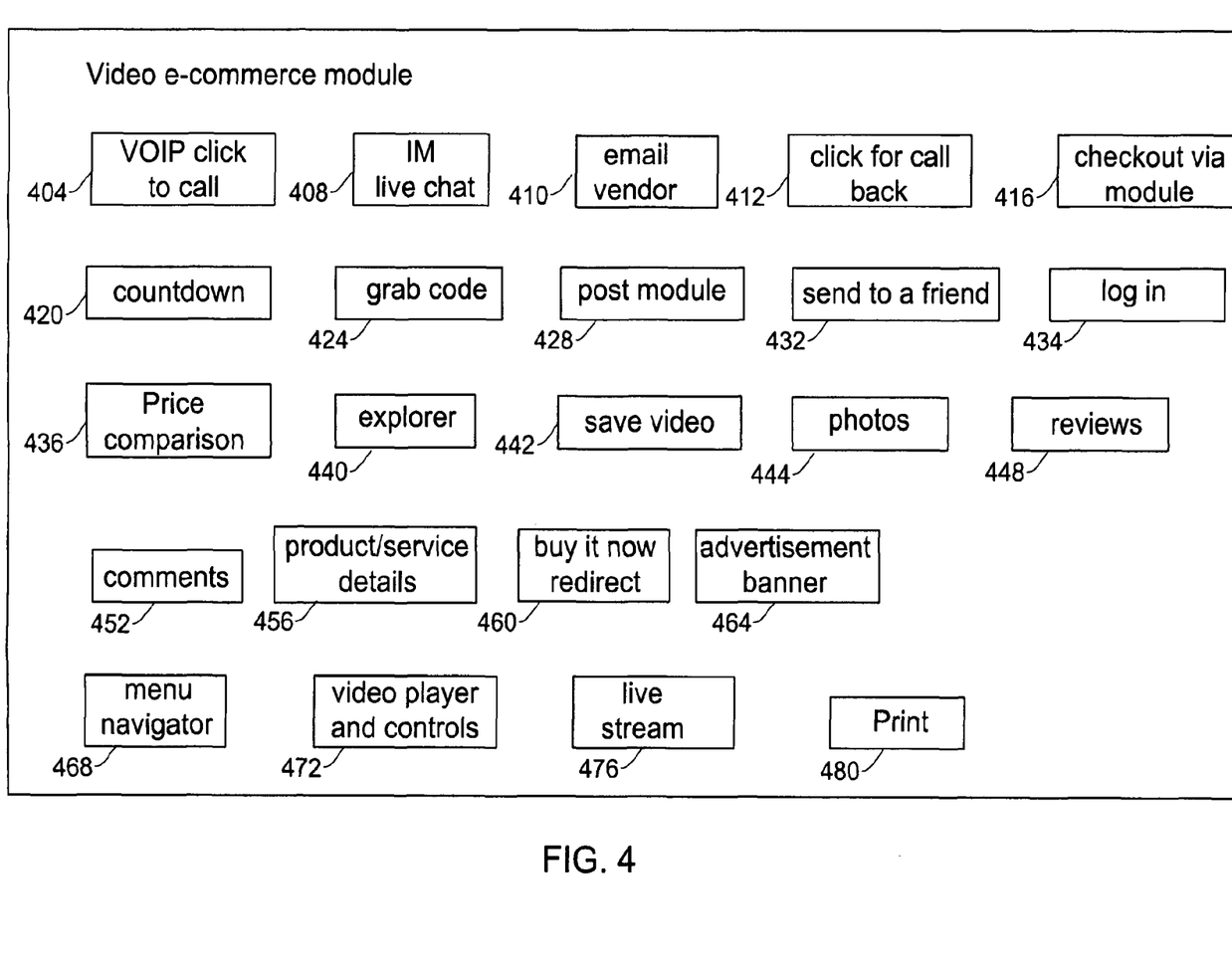
FIG. 4 is a block diagram of a video e-commerce module, according to an embodiment.

Refer to FIG. 4, which illustrates components within the video e-commerce module, according to an embodiment. In the illustrated embodiment, the components include VOIP click to call 404, Instant Messaging IM live chat 408, email vendor 410, click for call back 412, checkout via module 416, countdown 420, grab code 424, post module 428, send to a friend 432, log in 434, price comparison 436, explorer 440, save video 442, photos 444, reviews 448, comments 452, product/service details 456, buy it now redirect 460, advertisement banner 464, menu navigator 468, video player and controls 472, live stream 476, and print 480. The video e-commerce module is not necessarily bound by the components illustrated in FIG. 4. The particular breakdown of the video e-commerce module into components shown in FIG. 4 was chosen for ease of explanation, but it should be evident that in some cases the video e-commerce module may comprise fewer, more and/or different components than those illustrated in FIG. 4, and/or a particular component may have more, less and/or different functionality than described herein. Each component of the video e-commerce module may be made up of any combination of hardware, software and/or firmware capable of performing the operations as defined and explained herein. In one embodiment, certain components of the video-e commerce module are activated after the catalog and included playlist (or single video link) has been received at client 190 and/or upon indication by the viewer.

For example, in the illustrated embodiment, the video player and controls component 472 provides the capability to play videos on the playlist of the catalog (or the one video whose episode (video) identifier was instead identified) and optionally any of the following functions inter alia: rewind, fast forward, stop, pause, volume, replay video skip to next video, go back to previous video, etc. In one embodiment, the video player is a flash video player. If there is a playlist of more than one video, the first video to play may have been configured manually or selected automatically, as discussed above. The videos (for example, depending on the module configuration) may begin playing automatically once the playlist or single video link has been received at client 190, begin playing automatically but are muted, or may only play upon viewer request (i.e. the activation trigger for playing may vary depending on the embodiment).

Referring to stage 256 of method 200, each time a video is played by video player 472, the video link (which was previously received as part of the playlist or as a single video link by client 190) is passed to the location where the video resides and the video stream (for example streamed flash video) is returned to the video e-commerce module. In one embodiment, the video e-commerce module includes a buffer in order to preload a certain amount of stream video before playing the video. In one embodiment the content distribution network ensures quality of service based on factors such as bandwidth, location of server (where video resides) and client (of viewer), network congestion, etc. as is known in the art.

Besides the playing of the videos, the video e-commerce module performs additional functionality for the viewer in stage 260. This additional functionality is also described with reference to FIG. 4.

In the illustrated embodiment, the viewer has the option to browse the playlist via playlist explorer 440. The viewer can thus select a video to play out of sequence from the sequence previously established. In some cases, playlist explorer 440 includes a slide bar for easy reviewing thumbnail previews of videos on the playlist. In some cases, playlist explorer 440 continually provides the viewer with preview(s) of the next video(s) on the playlist.

In the illustrated embodiment, the viewer has the option to save any video, for example that is currently playing or any one from the playlist using the save video component 442. In some cases, the saved videos can be browsed by logging in, for example via publishing system 120 or logging in from any video e-commerce module and clicking on "my saved videos," which will cause save video component 442 to show the saved videos. In this way, the viewer can create his own video shopping site of the videos he has saved. In some cases, the product/service identifier for each product/service associated with the saved video is also saved so that information on the product/service(s) can be returned from data repository 130 upon viewer request. As noted above, in some cases when a video is associated with only one product/service the video identifier may also identify the product/service and therefore in these cases the video identifier may be saved instead to later be able to retrieve information on the product/service from data repository 130. In some cases, when the viewer views the saved video, additional functionality as described with respect to one or more of the components of FIG. 4 may also be available to the viewer, relating to the saved video.

In the illustrated embodiment, the viewer has the option via "live stream" component 476 to select from among currently playing live video shows, to call in to the live show, and to receive the live video stream. In some cases, the viewer can only select from among related live video shows (e.g. consistent with any of the following: products/services in catalog, the categories of those products/services, the vendors of those products/services, the website keywords, the viewer specified information, etc.) but in other cases the viewer can select from any live video show. Depending on the embodiment, the viewer may be connected to the source of the live streaming directly or via vendor web site(s) 150.

In the illustrated embodiment, menu navigator 468, allows the viewer to browse through different options available to him or her. For example, in some cases, options which are heavily promoted or considered to be essential for video e-commerce can be selected by a viewer without traversing menu navigator 468 (for example with a separate control displayed on the user interface), whereas other options which are not as heavily promoted or not considered to be essential may be selected by traversing menu navigator 468. Continuing with the example, in one embodiment, "checkout via module" or "buy it now redirect" as well as video playing and controlling are heavily promoted options whereas the other options are available for selection through the menu navigator. In one embodiment, the display of the menu is configured on or off in stage 220 or stage 232 but may be later be turned off or on by the viewer.

In the illustrated embodiment, "grab code" component 424, "post module" component 428, "send to a friend" component 432, and/or "log-in" component 434 allow the viewer to manipulate the video e-commerce module for purposes unrelated to the catalog. For example, if the viewer chooses to "grab code", grab code component 424 copies the video e-commerce module. Optionally, grab code component 424 also requests the affiliate code of the viewer so that the current affiliate code associated with the module can be changed to the affiliate code of the viewer. The viewer can then paste the module (grabbed code), optionally with the changed affiliate code on a webpage affiliated with the viewer. As another example, if the viewer chooses to "post module", post module component 428 requests the URL of the target web page (for example blog, generic website, social platform, parked domain or search engine, etc.) and automatically publishes the module to that web page, changing the affiliate code to correspond to the affiliate code of the viewer. Continuing with the example, in some cases if the viewer is a registered user, the affiliate code of the viewer may be known, whereas in other cases the viewer may manually enter his affiliate code. In one embodiment, post module component 428 may call a distribution system such as for example gigya.com to publish the module. See also description of stage 236 above relating to "grab code" and "post code." As another example, if a viewer chooses to send the module to a friend, send to a friend component 432 will generate an email which will include a link to the video e-commerce module. The "friend" can press on the link in the email and be directed to the video e-commerce module. As another example, a log in component 434 allows a viewer to log into publishing system 120 from any video e-commerce module. Depending on the embodiment, some or all of the features of publishing system 120 may be accessible to the viewer via log in component 434. For example, in one embodiment, log in via a module may only allow access to reports and not to the other features of publishing system 120. In these examples (grab code, post code, send to a friend, and log in), the viewer is not necessarily a potential buyer, but may in some cases be instead an affiliate or potential affiliate, a vendor, etc.

In the illustrated embodiment, certain components of the video e-commerce module allow the viewer to view different types of data in the catalog. For example, photos component 444, reviews component 448, comments component 452, and/or details component 456 outputs data on the products/services which was previously returned by selector 132. For example, photos component 444 displays photos of products/services; reviews component 448 visibly and/or audibly outputs reviews (by professionals and/or viewers) of products/service; comments component 452 visibly and/or audibly outputs comments/tags on products/services; details components 456 visibly and/or audibly outputs details on products/services such as price, short description, if the product/service is a "hot deal" or "top seller", specifications, etc. In some cases, the specifications may be available as a download (e.g. PDF) in addition to or instead of within the module. In one embodiment, a viewer indicates the product/service (among those in the catalog returned by selector 132) for which the viewer wishes to receive information (e.g. photos, reviews, comments, count-down, details, etc.). In other embodiments, when a viewer selects photos, reviews, comments, details, etc., the data corresponding to the currently playing video (or if no video is playing then the previous or next video on the playing list) is provided. For example, if video #3 on the playlist is currently playing, and the viewer indicates a desire for photos, a photo or photo(s) of the product/service corresponding to video #3 is provided to the viewer by photos component 444. As another example, if video #4 on the playlist is currently playing, and video #4 on the playlist relates to two products/services, then in one of these embodiments, the viewer may select whether photos are desired for both products/services or indicate for which products/service photo(s) are desired, whereas in another of these embodiments the viewer may be presented with one or more photos relating to the product/service corresponding to the currently playing segment of video #4. In the latter embodiment, the mapping between the different segments of the video and the various associated products/services discussed above may enable photo component 444 (or, similarly for other types of data, may enable any of components 448, 452, and/or 456) to determine the currently corresponding product/service.

In one embodiment, a viewer may also use photos component 444, reviews component 448, comments component 452, and/or details component 456 to input data, for example photos, reviews, comments/tags, etc. In this embodiment, the inputted data may be saved to data repository 134, for example by way of tracking engine 142. In some cases, reviews components 448 may present the viewer with forms and/or polls (i.e. surveys) to fill out, and the filled out information may be saved to data repository 134, for example by way of tracking engine 142.

In the illustrated embodiment, a viewer may also get ("external") information which was not provided by selector 132, for example via VOIP click to call component 404, IM live chat component 408, email vendor component 410, click for callback component 412, countdown component 420, or price comparison component 436. For example, VOIP click to call component 404 provides the viewer with the capability of participating in a call over the Internet with another party, for example, vendor call center 182. Depending on the embodiment, the VOIP call may or may not use other communication networks such as PSTN and cellular in addition to the Internet. As another example, IM live chat component 408 provides the viewer with the capability of participating in an online chat session with another party, for example vendor online store 158. In some cases, IM live chat component 408 may additionally or alternatively allow the viewer to see the vendor live on video and see live product demonstrations. As another example, email vendor component 410 provides the viewer with the capability of sending an email to vendor online store 158. In some cases, the viewer may fill out a form within the module including any of the following inter alia: his name, email address, subject matter of the email (for example chosen from a drop down list), message text (e.g., question) etc., and then press a send button to send the message. In some cases, the viewer may receive a confirmation email that the email was received and that the vendor will reply shortly. As another example, click for call back component 412, provides the viewer with the capability of receiving a callback from another party, for example from vendor call center 182, to a phone number defined by the viewer, optionally at a time specified by the viewer. In this example, the viewer may in some cases fill out a form within the video e-commerce module including any of the following inter alia: name, phone number, subject matter (for example chosen from a drop down list), message text (e.g., question), etc. As another example, countdown component 420 provides the viewer with a feed from inventory engine 186 that includes data such as quantity of product/service left in inventory, time left to make a purchase at a particular price level or at all, quantity of the product/service sold, etc. As another example, price comparison component 436 provides the viewer with a feed from a price comparison company with comparative pricing information, such as Pronto.com.

In one embodiment, a viewer indicates the product/service (among those in the catalog returned by selector 132) for which the viewer wishes to receive external information (for example, by VOIP, chat, email, callback, inventory feed, price comparison feed). In other embodiments, when a viewer selects VOIP click to call, IM live chat, email to vendor, click for callback, countdown, or price comparison, the feature is activated for the product(s)/service(s) corresponding to the currently playing video (or if no video is playing then the previous or next video on the playing list). For example, if video #5 on the playlist is currently playing, and the viewer indicates a desire for VOIP call, a VOIP call will be initiated by VOIP click to call component 404 with the vendor call center for the product/service corresponding to video #5. As another example, if video #6 on the playlist is currently playing, and video #6 on the playlist relates to five products/services, then in one of these embodiments, the viewer may select whether a VOIP call is desired for all the related products/services or an indicated subset of the five products/services, whereas in another of these embodiments a VOIP call may be initiated to the vendor call center for the product/service corresponding to the currently playing segment of video #6. In the latter embodiment, the mapping between the different segments of the video and the various associated products/services discussed above may enable VOIP click to call component 404 (or in similar embodiments, component 408, 410, 412, 420, or price comparison component 436) to determine the currently corresponding product/service.

In the illustrated embodiment, the viewer may purchase products/services in the catalog via buy it now redirect component 460 and/or checkout via module component 416. For example, the buy it now redirect component 460 redirects the viewer to vendor online store 158 (in accordance with the received link for buying from vendor online store 158—i.e. the "buy it now link") to complete the transaction for that product/service. As another example, check out via module component 416 allows the viewer to complete the transaction by way of the video e-commerce module without being redirected to another website. Continuing with the example, in one embodiment, checkout component 416 includes any of the following capabilities inter alia for completing the transaction: communicating with inventory engine 186, adding a product/service to cart; receiving from inventory engine 186 inventory information; indicating to inventory engine 186 to reduce quantity of remaining inventory and/or increase quantity sold; receiving payment and delivery information from the viewer or deriving this information, for example from a stored cookie on client 190; communicating with payment gateway 184 for payment approval and charging of viewer; communicating the product/service delivery information to vendor online store 158 or to whichever entity is responsible for delivery, etc. Depending on the embodiment, the payment gateway 184 may allow payment through various options including any of the following inter alia: Google checkout, PayPal, and credit card.

In one embodiment, a viewer indicates the product/service (among those in the catalog returned by selector 132) that the viewer wishes to buy (for example using buy it now redirect or using checkout via module). In other embodiments, when a viewer selects buy-it now redirect or checkout via module, the feature is activated for the product(s)/service(s) corresponding to the currently playing video (or if no video is playing then the previous or next video on the playing list). For example, if video #7 on the playlist is currently playing, and the viewer indicates a desire for checkout via module, checkout via module component 416 completes the transaction for the product/service corresponding to video #7. As another example, if video #8 on the playlist is currently playing, and video #8 on the playlist relates to three products/services, then in one of these embodiments, the viewer may select whether checkout is desired for all the related products/services or an indicated subset of the three products/services, whereas in another of these embodiments checkout may be initiated for the product/service corresponding to the currently playing segment of video #8. In the latter embodiment, the mapping between the different segments of the video and the various associated products/services discussed above may enable checkout component 416 to determine the currently corresponding product/service.

In some embodiments, each time the video e-commerce module puts a viewer in touch with a vendor for more information (for example, VOIP, chat, email, callback) and/or results in a viewer buying a product/service (for example buy it now redirect or checkout via module), the affiliate code (of the affiliate from whose website 170 the module was loaded onto client 190) is transferred to the vendor. For example, the affiliate code may be embedded in a link to the vendor or may be sent separately. In this way, the vendor can appreciate and/or compensate the affiliate for the contact/sale. In one of these embodiments, the affiliate is also informed when the viewer is put in touch with the vendor for more information and/or buys a product/service. For example, in some cases "buy it now" redirects to the vendor and/or other links to the vendor may be redirected via affiliate network system 160 so that affiliate network system 160 may follow up on disbursements of commissions to affiliates and/or to affiliate network system 160, etc. In another embodiment, additionally or alternatively, the video e-commerce facilitator may provide the vendor and/or affiliate with a consolidated report including instances that a viewer was put in touch with the vendor, instances that a viewer bought a product/service and/or including other tracked information relating to a video e-commerce module which was published on an affiliate website.

Print component 480 allows the viewer to print what is currently being displayed on the video e-commerce module. Advertisement banner 464 allows a banner to be displayed within the video e-commerce module.

Although mentioned above, it is again emphasized to the reader that in other embodiments, a video e-commerce module may have less, more and/or different components than those discussed with reference to FIG. 4.

Referring again to method 200 (FIG. 2), the actions of the video e-commerce module (which are executed automatically and/or in reaction to viewer action) may be tracked. The tracking is represented by stage 262, although the tracking in some cases may take place in parallel to any stage of method 200, for example stage 256, 260, etc. The tracking is performed by tracking engine 142. In one embodiment, tracking engine 142 is assisted by an API, for example a web service.

Depending on the embodiment, the tracking can be of varying degrees of comprehensiveness. For example, in one embodiment, only buy it now redirects and checkouts are tracked. As another example, in one embodiment, additionally or alternatively, any action for which an affiliate or the video e-commerce facilitator will be compensated by the vendor is tracked. In this example, for actions where the affiliate is compensated, the tracking data may in some cases need to include the affiliate code. As another example, additionally or alternatively, any action which requires an update of the data in data repository 134 (in some cases any of the following inter-alia: viewer inputted data such as comments/tags/reviews/polls/forms/etc., tracking data which influences selection/sequencing by selector 132, etc.) is tracked. As another example, additionally or alternatively, actions by the viewer relating to the video which indicate enjoyment (for example, replay video, save video) or non-enjoyment of the video (for example, skip to next video) are tracked. As another example, additionally or alternatively, actions by the viewer which indicate that the video has caused the viewer to consider the associated product(s)/service(s) are tracked, for example viewer clicks on photos, reviews, comments, details, VOIP click to call, IM live chat, email to vendor, click for callback, or price comparison while a video is playing. As another example, additionally or alternatively, actions by the viewer which show that the video e-commerce module is attractive are tracked, for example "grab code," "post module," send to a friend. As another example, additionally or alternatively, viewer actions which affect how selector 132 generates, modifies or sequences a playlist are tracked. As another example, additionally or alternatively, the tracking may commence each time a module is loaded onto any client 190.

As mentioned above, in some cases, some of the information tracked by tracking engine 142 may be saved in data repository 134. For example, referring to the algorithm example of stage 322, where buy it now/checkout clicks and the number of times that a video is viewed affects the sequencing of the playlist, tracking data relating to buy it now/checkout clicks and video views are saved in data repository 134 so that selector 132 can execute the algorithm. As another example, data inputted by the user such as comments, tags, polls, reviews, forms, etc., may be tracked and saved in data repository 134.

In stage 264, reporting engine 144 uses the tracked data to prepare reports. In one embodiment, reporting engine 144 is assisted by an API, for example a web service. Reports can be used inter-alia for reviewing the performance of the video e-commerce module.

In one embodiment, reporting engine 144 produces reports according to rules set by the video e-commerce facilitator. In another embodiment, additionally or alternatively, a user may configure the content and/or format of the report, for example via report configurator 108 of publishing system 120. In some cases, reports may be viewed after logging in. For example, in some of these cases, a vendor may only be allowed to view reports relating to products/services thereof, and/or an affiliate may only be allowed to view reports relating to a video e-commerce module published on the affiliate website thereof (i.e. associated with the code of the affiliate). In some embodiments, there may be different channels for a user to log in and view a report, for example via report viewer 116 of publishing system 120, via a video e-commerce module, etc. In one of these embodiments where the log-in is via a video e-commerce module, the module does not necessarily have to be associated with the user who is logging in (i.e. a vendor does not have to have his products/services on the module to log-in through the module, an affiliate may log-in through a module on a web site of another affiliate, etc.) In some of these embodiments, the format and/or content of the report may vary depending on the channel. For example, in one of these embodiments, only a summary report may be available via a video e-commerce module, whereas reports with differing levels of detail may be available via report viewer 116.

As can be seen from the description above, many embodiments relate to technological methods, systems and/or computer readable mediums for video e-commerce. However, some embodiments additionally or alternatively relate to incentives, compensations and/or opportunities which may in some cases facilitate video e-commerce. In one of these embodiments, an affiliate may be provided with a monetary incentive to publish the video e-commerce module. Possible monetary incentives are not limited by the invention. For example, in some cases the affiliate may receive a percentage of sales transactions completed within the published video e-commerce module ("checkout via module"), sales transactions resulting from redirecting the viewer to the web site 150 of the vendor via the module ("buy it now redirect") and/or sale transactions resulting from requests for information from the vendor via the e-commerce module (e.g. chat, email, VOIP, and callback, etc.). Continuing with this example, in some cases the compensation may only be for sales completed within a predetermined period from the time the viewer clicked on buy it now or requested information from the vendor. As another example, additionally or alternatively, in some cases the affiliate may receive compensation for other actions of a viewer of the module, for example each time the viewer requests to be put in touch with the vendor for more information (e.g. VOIP, chat, email, and callback). As another example, in some cases there may be a higher level of compensation for an affiliate who created the catalog (and included playlist) for the published module versus an affiliate who selected a pre-existing catalog/playlist or had selector 132 create the catalog/playlist. In some cases, affiliate network system 160 also receives compensation when an affiliate which selected the module via affiliate network system 160 gets compensated.

In one of these embodiments, in order for the affiliate and optionally affiliate system 160 to be compensated, the disburser of the compensation (for example the vendor and/or facilitator) may in some cases need to be aware of the identity of the affiliate. For this reason, the affiliate code which was associated with the video e-commerce module in stage 232 may in some cases be important. In some cases, the affiliate and/or affiliate network system 160 may be compensated by the vendor based on data which the vendor is aware of without reviewing a report by reporting engine 144 (although this does not preclude a report of the data also being generated by reporting engine 144). For example, it is possible that in one embodiment a vendor may compensate the affiliate and/or affiliate system 160 for sales ensuing from buy it now redirects or ensuing from requests for information via the e-commerce module (e.g. chat, email, VOIP, and callback, etc.). In this example, the buy it now redirect, email, VOIP, callback or chat initiated by the module may cause code of the affiliate to be provided to the vendor (for example because the code is embedded in the link to the vendor or otherwise) so that the vendor can compensate the correct affiliate and/or affiliate system 160 for any resulting sales. In this example, the operations such as the buy it now redirect, email, VOIP, callback or chat initiated by the module may in some cases also be indicated to the affiliate and/or affiliate system (for example by having a link or separate communication of the code to the vendor pass via the affiliate and/or affiliate system, through feedback from the module, and/or via a report prepared by reporting engine 144). In another embodiment, additionally or alternatively compensation of affiliates and/or affiliate network system 160 may be based on reports generated by reporting engine 144.

In one of these embodiments, the facilitator is compensated by the vendor. Possible compensation schemes are not limited by the invention. For example, in some cases the facilitator may be compensated for any of the following inter alia: views of videos/products/services, buy it now redirect clicks, checkout via module clicks, IM live chat clicks, emails to vendor, VOIP clicks to call, clicks for callback, percentages on sales completed via checkout, percentages on sales resulting from buy it now redirect, etc.

In one of these embodiments, the vendor has the opportunity to transact more sales because the offered product/service is displayed on affiliate web site(s) 170. It is important to note, that the usage of video typically provides a compelling presentation of the associated product/service and therefore attracts a viewer to purchase the product/service. In an embodiment where the catalog (and included playlist) is customized to the affiliate website and/or viewer, there is a more targeted presentation of products/services and therefore in some cases it may be more likely that the viewer will be presented with a product/service which interests him or her. In an embodiment where checkout is completed within the video e-commerce module, the viewer may in some cases be less likely to abort the transaction than if redirected to another site to complete the transaction.

From the description above, the reader will understand that in some cases, the catalog which is embodied (e.g. expressed and/or stored) on a computer readable medium is an item which can potentially be bought and sold due to its valuable contribution to video e-commerce. Even though in some embodiments of the invention, the catalog may be provided to another party without payment for the catalog per-se, this fact does not detract from the valuable nature of the catalog.

The reader will also understand from the description above, that in some cases, the video e-commerce module is an item which could potentially be bought and sold due to its valuable contribution to video e-commerce. Although in some embodiments the module may be provided to another party without payment for the module per se, this fact does not detract from the valuable nature of the module. As mentioned above, the video e-commerce module may be made up of any combination of software, hardware and/or firmware capable of performing the functions defined and explained herein. For example, in some cases, the video e-commerce module may be embodied on a computer readable medium.

It will also be understood that in some embodiments the system may be a suitably programmed computer. Likewise, some embodiments contemplate a computer program being readable by a computer for executing the method. Some embodiments further contemplate a machine-readable memory tangibly embodying a program of instructions executable by the machine for executing the method.

While the subject matter herein has been shown and described with respect to particular embodiments, it is not thus limited. Numerous modifications, changes and improvements within the scope of the disclosure will be apparent to one of ordinary skill in the art.

Having thus described our invention, what is claimed follows below.

The invention claimed is:

1. Apparatus, to facilitate video interactions between a publisher, and a set of end users, the publisher having content available from a network-accessible site, and each of the set of end users having a device that includes a media player, the apparatus comprising:
   one or more hardware processors;
   computer memory storing computer program code adapted to be executed in the one or more hardware processors to:
      receive information to configure a video module to execute in association with the end user media players, wherein a configuration of the video module includes video sequencing control information, wherein a particular instance of the video module is adapted to execute as an end user media player renders a video to provide for video sequence control and interactivity to the video, the interactivity specifying at least one of a set of interactivity actions available to an end user while the video is being rendered by the end user media player according to any video sequencing control data specified by the video module, the particular instance of the video module operative to augment operation of the end user media player with which it executes to thereby improve the end user media player;
      publish the video module; and
      receive data about (i) execution of the video module in the end user media players, and (ii) the interactivity actions.

2. The apparatus as described in claim 1 wherein the set of interactivity actions available to an end user includes one of: initiating a call or chat, requesting a callback, requesting additional information, sending an e-mail, interacting with an application or page, adding information to an e-mail list, and performing an e-commerce transaction.

3. The apparatus as described in claim 1 wherein the video module is configured to play the video from a playlist that includes one or more videos.

4. The apparatus as described in claim 1 wherein the video module is a video e-commerce module and the interactivity action facilitates a purchase of a commodity identified in the video.

5. The apparatus as described in claim 1 wherein the information includes a parameter that configures the video module to configure and generate a run-time video playlist when the video module is executed in an end user media player.

6. The apparatus as described in claim 1 wherein the computer program code is further adapted to associate the video module so configured with one or more pages.

7. A method to facilitate video interactions between a publisher, and a set of end users, the publisher having content available from a network-accessible site, and each of the set of end users having a device that includes a media player, comprising:
   receiving information to configure a video module to execute in association with the end user media players, wherein a particular instance of the video module is adapted to execute as an end user media player renders a video to provide for video sequence control and interactivity to the video, the interactivity specifying at least one of a set of interactivity actions available to an end user while the video is being rendered by the end user media player according to video sequencing control data specified by the video module, the particular instance of the video module operative to augment operation of the end user media player with which it executes to thereby improve the end user media player;

publishing the video module; and receiving data about (i) execution of the video module in the end user media players, and (ii) the interactivity actions;

wherein the receiving, publishing and receiving steps are carried out in software executing in one or more hardware elements.

8. The method as described in claim 7 wherein the set of interactivity actions available to an end user includes one of: initiating a call or chat, requesting a callback, requesting additional information, sending an e-mail, interacting with an application or page, adding information to an e-mail list, and performing an e-commerce transaction.

9. The method as described in claim 7, further including associating the video module so configured with one or more pages.

10. An article, comprising computer program instructions executing in a non-transitory computer readable medium, the computer program instructions comprising a video module, the video module adapted to execute as an end user media player renders a video to provide for video sequence control and interactivity to the video, the interactivity specifying at least one of a set of interactivity actions available to an end user while the video is being rendered by the end user media player according to video sequencing control data specified by the video module, the video module being operative in response to receipt of data indicating an end user selection of one of the set of interactivity actions to generate data indicating (i) execution of the video module in association with the video, and (ii) a type of interactivity, the video module operative to augment operation of the end user media player with which it executes to thereby improve the end user media player.

11. The article as described in claim 10 wherein the set of interactivity actions available to an end user includes one of: initiating a call or chat, requesting a callback, requesting additional information, sending an e-mail, interacting with an application or page, adding information to an e-mail list, and performing an e-commerce transaction.

\* \* \* \* \*